US006210789B1

(12) United States Patent
Hanrahan

(10) Patent No.: US 6,210,789 B1
(45) **Date of Patent: *Apr. 3, 2001**

(54) ELECTRICALLY CONDUCTIVE COMPOSITE ARTICLE

(75) Inventor: James R. Hanrahan, Newark, DE (US)

(73) Assignee: W. L. Gore & Associates, Inc., Newark, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 08/827,912

(22) Filed: Feb. 20, 1997

(51) Int. Cl.[7] .......... B32B 25/08; B32B 25/14; B32B 25/20; B32B 27/20

(52) U.S. Cl. .......... 428/324; 428/305.5; 428/317.9; 428/318.4; 428/319.3; 428/320.2; 428/325; 428/327; 428/328; 428/406; 428/421; 428/422; 428/447

(58) Field of Search .......... 428/325, 324, 428/327, 328, 329, 330, 331, 363, 403, 404, 406, 421, 422, 447, 306.6, 308.4, 317.9, 318.4, 319.9, 305.5, 319.3, 320.2

(56) References Cited

U.S. PATENT DOCUMENTS

| | | | |
|---|---|---|---|
| 4,557,957 | 12/1985 | Manniso | 428/36 |
| 4,720,400 | 1/1988 | Manniso | 427/243 |
| 4,857,668 | 8/1989 | Buonanno | 174/35 GC |
| 4,931,479 | 6/1990 | Morgan | 521/76 |
| 5,028,739 | 7/1991 | Keyser et al. | 174/35 GC |
| 5,045,635 | 9/1991 | Kaplo et al. | 174/35 GC |
| 5,105,056 | 4/1992 | Hoge, Jr. et al. | 174/35 GC |
| 5,130,024 | 7/1992 | Fujimoto et al. | 210/500.36 |
| 5,202,536 | 4/1993 | Buonanno | 174/35 GC |
| 5,209,967 | 5/1993 | Wright et al. | 428/283 |
| 5,286,568 | 2/1994 | Bacino et al. | 428/422 |
| 5,294,270 | 3/1994 | Fenical | 148/576 |
| 5,401,901 | 3/1995 | Gerry et al. | 174/35 MS |
| 5,429,869 | 7/1995 | McGregor et al. | 428/364 |
| 5,519,172 | 5/1996 | Spencer et al. | 174/110 |
| 5,904,978 * | 5/1999 | Hanrahan et al. | 428/313.5 |

FOREIGN PATENT DOCUMENTS

| | | |
|---|---|---|
| 1053932 | 8/1991 | (CN) . |
| 0 779 629 | 6/1997 | (EP) . |
| 61-174700 | 8/1986 | (JP) . |
| 62-100539 * | 5/1987 | (JP) . |
| 1-152042 | 6/1989 | (JP) . |
| 1724739 | 11/1989 | (SU) . |
| WO 88/07063 | 9/1998 | (WO) . |

* cited by examiner

*Primary Examiner*—Vivian Chen
(74) *Attorney, Agent, or Firm*—Allan M. Wheatcraft

(57) ABSTRACT

An electrically conductive composite article consisting essentially of a main body composed of a polytetrafluoroethylene material and a plurality of electrically conductive particles, wherein an elastomer material is disposed within the main body.

9 Claims, 4 Drawing Sheets

ELECTRICALLY CONDUCTIVE COMPOSITE ARTICLE

FIELD OF THE INVENTION

The present invention generally relates to an improved, electrically conductive polytetrafluoroethylene article.

BACKGROUND OF THE INVENTION

Electromagnetic interference (EMI) has been defined as undesired conducted or radiated electrical disturbances from an electrical or electronic apparatus, including transients, which can interfere with the operation of other electrical or electronic apparatus. Such disturbances can occur anywhere in the electromagnetic spectrum. Radio frequency interference (RFI) is often used interchangeably with electromagnetic interference, although it is more properly restricted to the radio frequency portion of the electromagnetic spectrum, usually defined as between 10 kilohertz (kHz) and 100 gigahertz (GHz).

A shield is defined as a metallic or otherwise electrically conductive configuration inserted between a source of EMI/RFI and a desired area of protection. Such a shield may be provided to prevent electromagnetic energy from radiating from a source. Additionally, such a shield may prevent electromagnetic energy from entering a shielded system. As a practical matter, such shields normally take the form of an electrically conductive housing which is electrically grounded. The energy of the EMI/RFI is thereby dissipated harmlessly to ground.

Necessarily, most housings for electrical equipment are provided with access panels, hatches, doors or removable covers. Gaps which form between the panels, hatches, doors or removable covers provide an undesired opportunity for electromagnetic energy to leak into the shielded system. Such gaps also interfere with electrical current running along the surfaces of a housing. For example, if a gap is encountered, the impedance of the gap is such that electromagnetic energy may radiate from an opposed side of the gap, much like a slot antenna.

Various configurations of gaskets have been developed over the years to close the gaps of such shields and to effect the least possible disturbance of the ground conduction currents. Each seeks to establish as continuous as possible electrically conductive path across the gap(s). However, there are inevitable compromises between: the ability of the gasket to smoothly and thoroughly engage and conform to the surface of the housing adjacent the gaps; the conductive capacity of the gasket; the ease of mounting the gasket; and the cost of manufacturing and installing the gasket.

Presently, many electronic devices, such as but not limited to, pocket pagers, cellular phones, laptop computers and wireless local area networks (LANS) are constructed using metallized plastic injection molded housings which are not manufactured to exact tolerances. Therefore, gaps form about the seams of an individual housing. Typically, in such devices mating housing members incorporate a snap-together method of closure, or in other instances, a limited number of light gauge screws are utilized to provide housing closure. Accordingly, most electronic devices having metallized plastic injected molded housings do not require substantial closure force to assemble a respective housing. Any shielded gasket which is incorporated into such electronic devices must be deformable or extremely conductive under a low compression force.

Conventionally, conductive particle filled silicone elastomers have been utilized as conductive gaskets to reduce EMI and RFI. However, such materials tend to be relatively hard (e.g. Shore A hardness of about 60 or greater). Because of their hardness, conductive particle filled silicone elastomers are not well suited for use as a gasket in a device having a housing which is assembled with a substantially low closure force. Additionally, conductive particle filled silicone elastomers are difficult to manipulate when die cut into a thin gasket.

Other EMI/RFI shielding gaskets have been proposed which incorporate a conductive fabric or mesh which surrounds a soft, conformable foam material. Examples of such gaskets are disclosed in U.S. Pat. Nos. 5,028,739; 5,115,104; 4,857,668; 5,045,635; 5,105,056; 5,202,526; and 5,294,270. Although the gaskets disclosed in the foregoing U.S. patents may be deformable under a low compression force, these gaskets do not have continuous conductivity throughout the material. Therefore, these gasket materials cannot be die cut into arbitrary shapes to function as an EMI/RFI gasket.

Seemingly, what the prior art lacks is an improved electrically conductive material which is extremely conductive under a low compressive load, and which is conformable and continuously conductive throughout the structure of the material such that the material is operable, in one application, to provide EMI shielding, in a frequency range from about 10 MHz to about 20 GHz, when used as a gasket between conductive seams.

SUMMARY OF THE INVENTION

The present invention relates to an electrically conductive composite article. The electrically conductive composite article is defined by a main body having a predetermined shape. The main body consists of a polytetrafluoroethylene material and a plurality of electrically conductive particles. Disposed within the main body is an elastomer material. The electrically conductive composite article of the present invention is permanently and continuously electrically conductive throughout its entire structure.

The electrically conductive particles may be selected from a group consisting of: metal powder, metal bead, metal fiber, metal flake, metal coated fiber, metal coated metals, metal coated ceramics, metal coated glass bubbles, metal coated glass beads, and metal coated mica flakes.

Suitable elastomer materials include but are not limited to: silicone elastomers, silicone rubbers, fluorosilicone elastomers, fluorocarbon elastomers, perfluoro elastomers, fluoroelastomers, polyurethane, or ethylene/propylene (EPDM).

It is, therefore, a purpose of the present invention to provide an improved, continuously electrically conductive polytetrafluoroethylene article for use in a variety of applications requiring a flexible and continuously electrically conductive material throughout the entire structure of the article.

It is also a purpose of the present invention to provide an improved electrically conductive material for use as an EMI shielding gasket.

BRIEF DESCRIPTION OF THE DRAWINGS

The foregoing summary, as well as the following detailed description of a preferred embodiment of the invention, will be better understood when read in conjunction with the appended drawings and graphs. For purposes of illustrating the invention, there is shown in the drawings an embodiment which is presently preferred. It should be understood, however, that the invention is not limited to the precise arrangement shown. In the drawings.

DETAILED DESCRIPTION OF THE INVENTION

Figure 1:
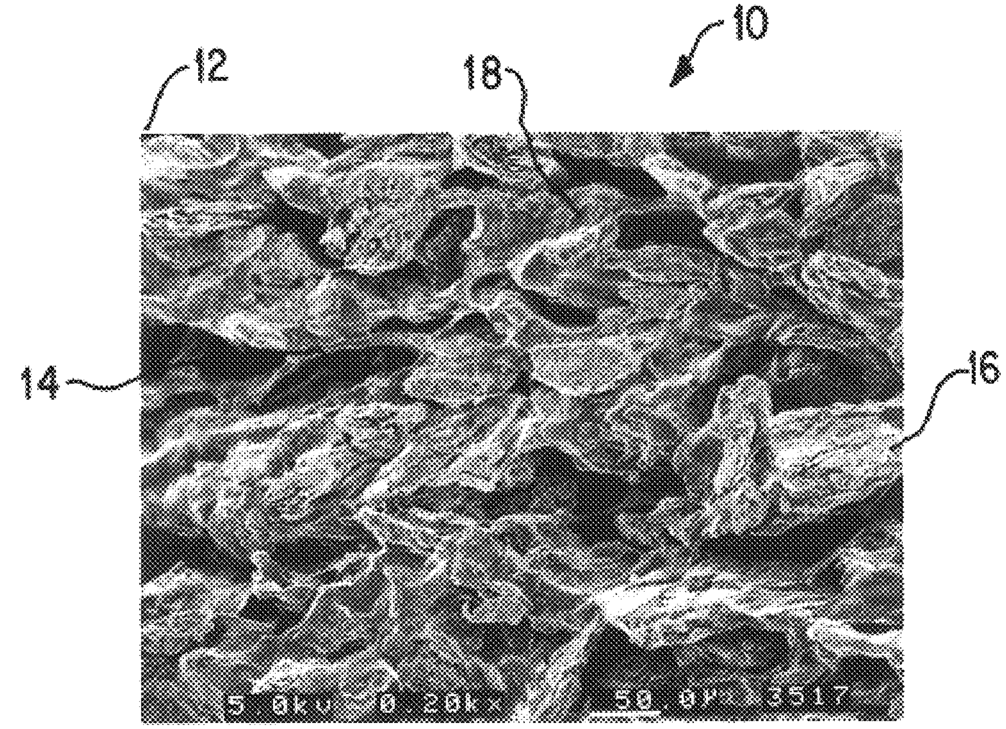
FIG. 1 is a scanning electron micrograph showing a cross-sectional view of the electrically conductive composite article of the present invention.
Figure 2:
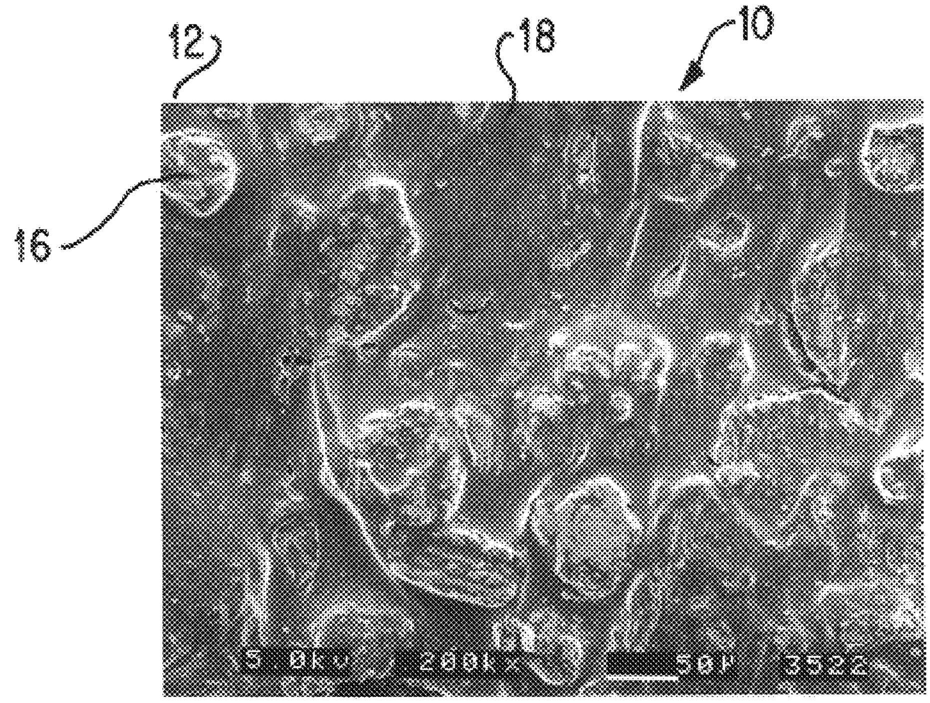
FIG. 2 is a scanning electron micrograph showing a plan view of a surface of the electrically conductive composite article of the present invention.

As best seen by reference to FIG. 1, an electrically conductive composite article 10 has a main body 12 which may be dimensioned to form any predetermined shape. The main body 12 is defined by a polytetrafluoroethylene (PTFE) material 14 and a plurality of electrically conductive particles 16. Disposed within the main body 12 is an elastomer material 18.

The composite article of the present invention is permanently and continuously electrically conductive throughout its entire structure, (i.e. electric current will freely flow through the composite article of the present invention due to the low resistivity of the article). The electrically conductive composite article of the present invention may be effectively employed in a variety of useful applications, including but not limited to, an electrically conductive grounding and shielding material, battery and fuel cell applications, as a catalytic material, as a flow through electrode in electrolyte systems, instrumentation applications, electrofiltration applications, microwave applications, antenna systems or strip lines, for example.

In an application wherein the article of the present invention is employed as an electrically conductive shield, the article 10 is inserted between a source of EMI/RFI and a desired area of protection. Such a shield may be provided to prevent electromagnetic energy from radiating from a source. Additionally, such a shield may prevent electromagnetic energy from entering the shielded system.

In accordance with the present invention, the main body 12 is defined by a plurality of electrically conductive particles and PTFE in the form of paste, dispersion or powder. The electrically conductive particles and PTFE are mixed in proportions to achieve a mixture containing about 50 to 90 volume percent electrically conductive particles. Mixture may occur by any suitable means, including dry blending of powders, wet blending, co-coagulation of aqueous dispersions and slurry filler, or high shear mixing, for example.

As the term is used herein, "volume percent" shall mean a percentage of the total volume of a material or mixture.

Electrically conductive particles enmeshed within the resulting composite article of the present invention is a major component thereof. The electrically conductive particles may include, but are not limited to, metal powder, metal bead, metal fiber, or metal flake, or the particles may be defined by a metal coated particulate such as metal coated metals, metal coated ceramics, metal coated glass bubbles, metal coated glass beads, or metal coated mica flakes. Preferred conductive materials in particulate form include, but are not limited to, silver, nickel, aluminum, copper, stainless steel, graphite, carbon, gold, or platinum, for example. Preferred metal coatings include silver, nickel, copper, or gold. Additionally, a combination or mixture of two or more of the foregoing may be employed. Average size of the conductive flakes can be from about 1 $\mu$m to about 200 $\mu$m, preferably from about 1 $\mu$m to about 100 $\mu$m, and most preferably from about 20 $\mu$m to about 40 $\mu$m. Average size for conductive powders can be from about 0.5 $\mu$m to about 200 $\mu$m, and most preferably from about 2 $\mu$m to about 100 $\mu$m.

The PTFE aqueous dispersion employed in producing the electrically conductive composite article of the present invention may be a milky-white aqueous suspension of PTFE particles. Typically, the PTFE aqueous dispersion will contain about 20% to about 70% by weight solids, the major portion of such solids being PTFE particles having a particle size in a range from about 0.05 micrometers to about 5.0 micrometers. Such PTFE aqueous dispersions are presently commercially available from the E. I. DuPont de Nemours Company, for example, under the tradename TEFLON® 3636, which is 18–24% by weight solids being for the most part PTFE particles of about 0.05 micrometers to about 5.0 micrometers.

In a preferred embodiment of the present invention, an elastomer material, such as a silicone elastomer material (e.g. dimethyl siloxane), is disposed within the main body 12. This is achieved by compounding a filled fine powder coagulum of PTFE and electrically conductive particles with the elastomer material. A suitable dimethyl siloxane is Sylgard® type 1-4105, or Q1-4010, which may be obtained from Dow Corning. (It may also be suitable to use a silicon dioxide reinforced silicone material such as Q3-661 which may also be obtained from Dow Corning.)

The elastomer material, such as the dimethyl siloxane, is added on a weight per weight basis, and may be diluted with a solvent, such as mineral spirits, for example. In general, the elastomer material may be added in amounts ranging from about 1 to about 75 percent, preferably from about 5 to about 20 percent, and most preferably from about 10 to about 15 percent. Other suitable elastomer materials include but are not limited to: silicone rubbers, fluorosilicone elastomers, fluorocarbon elastomers, perfluoro elastomers, fluoroelastomers, polyurethane, or ethylene/propylene (EPDM).

Subsequent to the addition of the elastomer material, the composite article is heated in a range from about 130° C. to about 190° C., to catalyze the elastomer material into a cured state. The resulting composite article is a continuously electrically conductive composite article having a main body which may be dimensioned into any suitable shape or thickness.

The addition of the elastomer material yields a continuously electrically conductive composite article with an increased z-strength and tensile strength. The elastomer also provides some degree of resilience. These desired properties are achieved without sacrificing electrical conductivity.

The following procedures were used to determine the properties of the materials created in accordance with the following examples.

Volume Resistivity

The volume resistivity was measured with round silver probes, one square inch in area. In order to achieve a measurement for uncompressed volume resistivity, a one pound weight was put on the probes to yield the resistance of the sample at one pound per square inch (psi). Heavier weights were employed to measure resistance of the composite article of the present invention at various compression levels. The conversion from resistance to volume resistivity is as follows:

$$\vartheta = \frac{RA}{L}(\Omega \cdot \text{cm});$$

$$\text{where: } \vartheta = \text{Volume resistivity};$$
$$R = \text{Resistance in ohms};$$
$$A = \text{Area of sample } (\text{cm}^2); \text{ and}$$
$$L = \text{Thickness of sample (cm)}.$$

Density

Density was obtained by using a 1"×6" template to cut a sample exactly 1"×6". The sample was then weighed to the nearest 0.01 grams and the density calculated as follows:

$$D(\text{g/cc}) = \frac{M}{V};$$

$$\text{where: } M = \text{Mass of sample to nearest .01 grams; and}$$
$$V = \text{Volume (Length} \times \text{width} \times \text{thickness)}.$$

Shielding Effectiveness

Shielding effectiveness was calculated by the following method:

$$\text{Shielding Effectiveness} = 20\log(\tau);$$

$$\text{where: } \tau = \text{Transmission Coefficient magnitude};$$
$$\tau = V_{out}/V_{in};$$
$$V_{out} = \text{Voltage at the output; and}$$
$$V_{in} = \text{Voltage at the input}.$$

The transmission coefficient was measured using a Hewlett-Packard type 8752A network analyzer. The test fixture used was based on a test fixture described in test method ARP-1705, however, the test fixture used was modified to work with the network analyzer. More particularly, since the transmission coefficient was directly measured by the network analyzer, a reference resistor was not used in conjunction with the fixture. Also, in order to yield the shielding effectiveness of the gasket under test without any contribution due to the fixture, the physical dimensions of the fixture were optimized for maximum transmissivity when no gasket was in place, and a normalization procedure was used to further remove the effect of the fixture.

Without intending to limit the scope of the present invention, the electrically conductive composite article of the present invention may be better understood by referring to the following examples:

EXAMPLE 1

11,060 g of nickel coated graphite (type 2224 from Westaim Corp.) was slurried in 65.5 liters of de-ionized water. The slurry was then coagulated with 7,654 g of PTFE dispersion at 26.0% solids. (Type TE-3636 from E. I. DuPont de Nemours and Company.) The resulting coagulum was then dried at 90° C. for 24 hours. The coagulum was then frozen at −10° C. for a minimum of 13 hours, and screened into a powder form through a ¼" mesh metal screen. The powder was then lubricated with a mixture containing 75% by weight polysiloxane (Sylgard® type 4105 obtained from Dow Corning, Inc.) and 25% by weight mineral spirits. The lubrication level was 0.25 pounds lubricant per pound of coagulum. This material was then refrozen at −10° C. for a minimum of 18 hours, and hand-screened through a ¼" mesh screen to remove any large lumps of lubed coagulum. The resulting lubricated powder was then allowed to dwell at ambient room conditions for a minimum of 24 hours. The material was then preformed into a 4" diameter pellet, and extruded into tape form approximately 140 mils thick. The extrudate was then calendered to 24 mils thick and 400 feet long. The tape was then continuously heated to 190° C. at a rate of five feet per minute. The material was then measured to determine the following properties:

$$\text{Vol. resistivity (1 psi)} = 46.3\,\Omega\,\text{cm}$$
$$(50\text{ psi}) = .087\,\Omega\,\text{cm}$$
$$(250\text{ psi}) = .020\,\Omega\,\text{cm}$$
$$\text{Density} = 1.95\text{ g/cc}$$

A sample of this material was then die cut into an annular ring having the following dimensions:

Inside diameter=1.92"

Outside diameter=2.00"

The shielding effectiveness (S.E.) of the annular ring was then measured. Results were determined and are graphically illustrated in FIG. 3.

Figure 3:
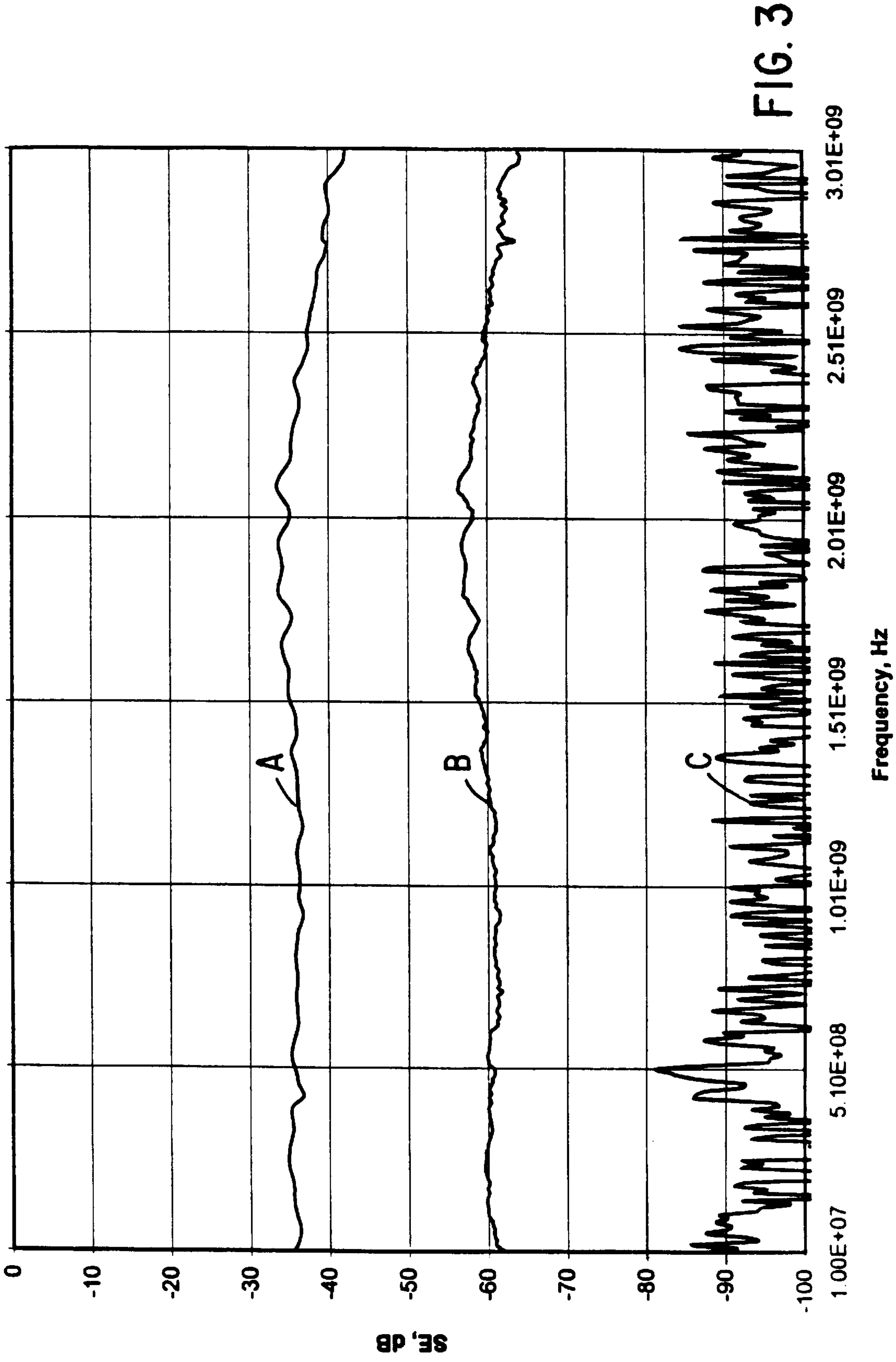
FIG. 3 is a graph of shielding effectiveness (dB) versus frequency (Hz) for one embodiment of the electrically conductive composite article of the present invention, wherein the electrically conductive particles are nickel coated graphite particles.

FIG. 3 represents the shielding effectiveness versus the frequency, from a range of $1\times10^7$ to $3\times10^9$ Hz. The S.E. was calculated for three different pressures. Line A represents the S.E. at 1 psi. Line B represent the S.E. at 50 psi. Line C represents the S.E. at 250 psi. A summation of the results follows:

At 1 psi, the S.E., which can be seen in FIG. 3 and is represented by line A, maintained a relatively constant S.E. throughout the tested frequency spectrum. The S.E. ranged from below −30 to about −40 dB., except for at very high frequency levels where the S.E. dropped below −40 dB.

At 50 psi, the S.E., represented by line B, acted similarly to line A, maintaining a relatively constant S.E. The S.E. leveled at about −60 dB., throughout the entire spectrum.

At 250 psi the S.E., represented by line C, averaged in a range below −90 dB., throughout the entire spectrum.

EXAMPLE 2

3,200 g of silver coated class beads (Metalite SF-20 obtained from PQ Industries) and 6,955 g of silver flake (Type 450 obtained from Technic, Inc.) was slurried in 12,395 g of IPA and 49,583 g de-ionized water. The slurry was then coagulated with 12,202 g of PTFE dispersion at 22.8% solids. (Type TE-3636 from E. I. DuPont de Nemours and Company). The resulting coagulum was then frozen at −10° C. for a minimum of 18 hours and screened into powder form through a ¼" mesh metal screen. The powder was then lubricated with a mixture containing 50% by weight polysiloxane (Sylgard® type 4105 obtained from Dow Corning, Inc.) and 50% by weight mineral spirits. The lubrication level was 0.20 pounds lubricant per pound coagulum. This material was then re-frozen at −10° C. for a minimum of 18 hours, and hand screened again through a ¼" mesh metal screen. The resulting lubricated powder was then allowed to dwell at ambient room conditions for a minimum of 24 hours. The material was then preformed into a 2.5" diameter pellet, and extruded into tape form approximately 50 mils thick and 4" wide. The tape was then calendered to 10 mils thick. Subsequently, the tape was heated to 150° C. for two minutes and the following properties were measured:

$$\text{Vol. resistivity (1 psi)} = .34\,\Omega\,\text{cm}$$

$$(50\text{ psi}) = 0.044\,\Omega\,\text{cm}$$

$$(250\text{ psi}) = 0.017\,\Omega\,\text{cm}$$

$$\text{Density} = 1.50\,\text{g/cc}$$

A sample of this material was then die cut into an annular ring having the following dimensions:

Inside diameter=1.92"

Outside diameter=2.00"

The shielding effectiveness (S.E.) of the annular ring was then measured. Results were determined and are graphically illustrated in FIG. 4.

Figure 4:
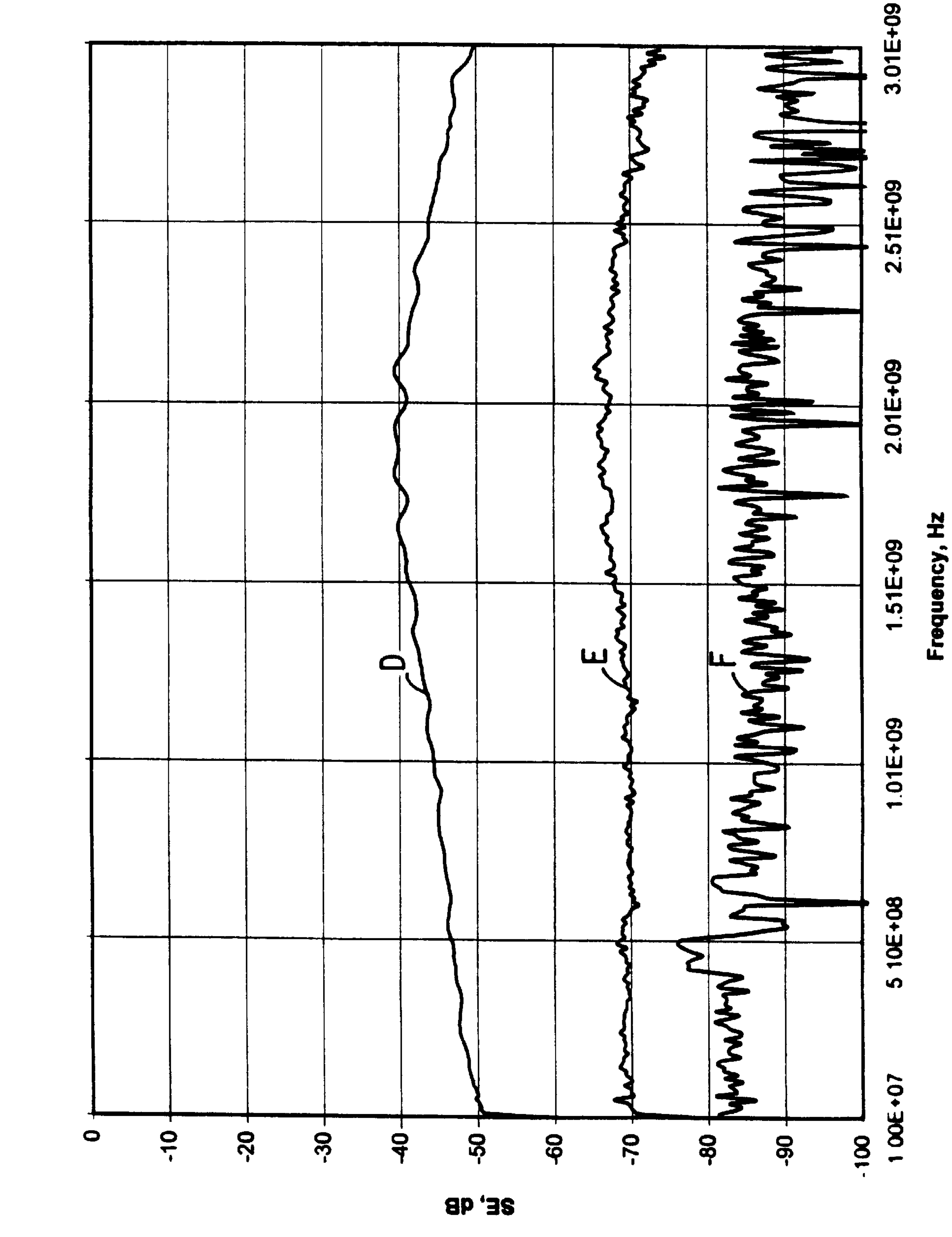
FIG. 4 is a graph of shielding effectiveness (dB) versus frequency (Hz) for one embodiment of the electrically conductive composite article of the present invention, wherein the electrically conductive particles are a mixture of silver flakes and silver coated glass beads.

FIG. 4 represents the shielding effectiveness versus the frequency, from a range of $1\times10^7$ to $3\times10^9$ Hz. The S.E. was calculated for three different pressures. Line D represents the S.E. at 1 psi. Line E represent the S.E. at 50 psi. Line F represents the S.E. at 250 psi. A summation of the results follows:

At 1 psi, the S.E., which can be seen in FIG. 4 and is represented by line D, maintained an average level below −40 dB.

At 50 psi, the S.E., represented by line E, maintained a relatively constant S.E., at about −70 dB., throughout the entire spectrum, except for an increase in dB., from about $1.51\times10^9$ to about $2.01\times10^9$ Hz., where the S.E. began to decrease and finally drop below −70 dB., at about $2.51\times10^9$ Hz.

At 250 psi the S.E., represented by line F, averaged in a range below −80 dB., throughout the entire spectrum.

COMPARATIVE EXAMPLE 3

3.81 pounds of Ketjenblack E300J (obtained from Akzo Chemical) was slurried in 22,406 grams of de-ionized water. The slurry was then coagulated with 16.0 pounds of PTFE dispersion (type TE-3636 obtained from E. I. DuPont de Nemours and Company) at 23.8% solids. The coagulum was then dried at 165° C. for about 24 hours. The frozen cakes were the forced through a ¼" mesh metal screen to make into powder. A lubricant of mineral spirits was added. The lubricated powder was then re-frozen for approximately 24 hours and re-screened. The resulting lubricated powder was then allowed to dwell at ambient room conditions for a minimum of 24 hours and preformed into a 4" diameter pellet. The pellet was heated to 49° C. and extruded into a tape form 6" wide and approximately 45" mils thick. The tape was then calendered to 16 mils thick, and dried in a continuous fashion above 180° C. at a rate to 15 fpm. The tape was then tested to determine the following properties:

$$\text{Vol. resistivity (1 psi)} = 12.2\,\Omega\,\text{cm}$$

$$(50\text{ psi}) = 2.0\,\Omega\,\text{cm}$$

$$(250\text{ psi}) = .022\,\Omega\,\text{cm}$$

A sample of this material was then die cut into an annular ring having the following dimension:

Inside diameter=1.92"

Outside diameter=2.00"

The shielding effectiveness (S.E.) of the annular ring was then measured. Results were determined and are graphically illustrated in FIG. 5.

Figure 5:
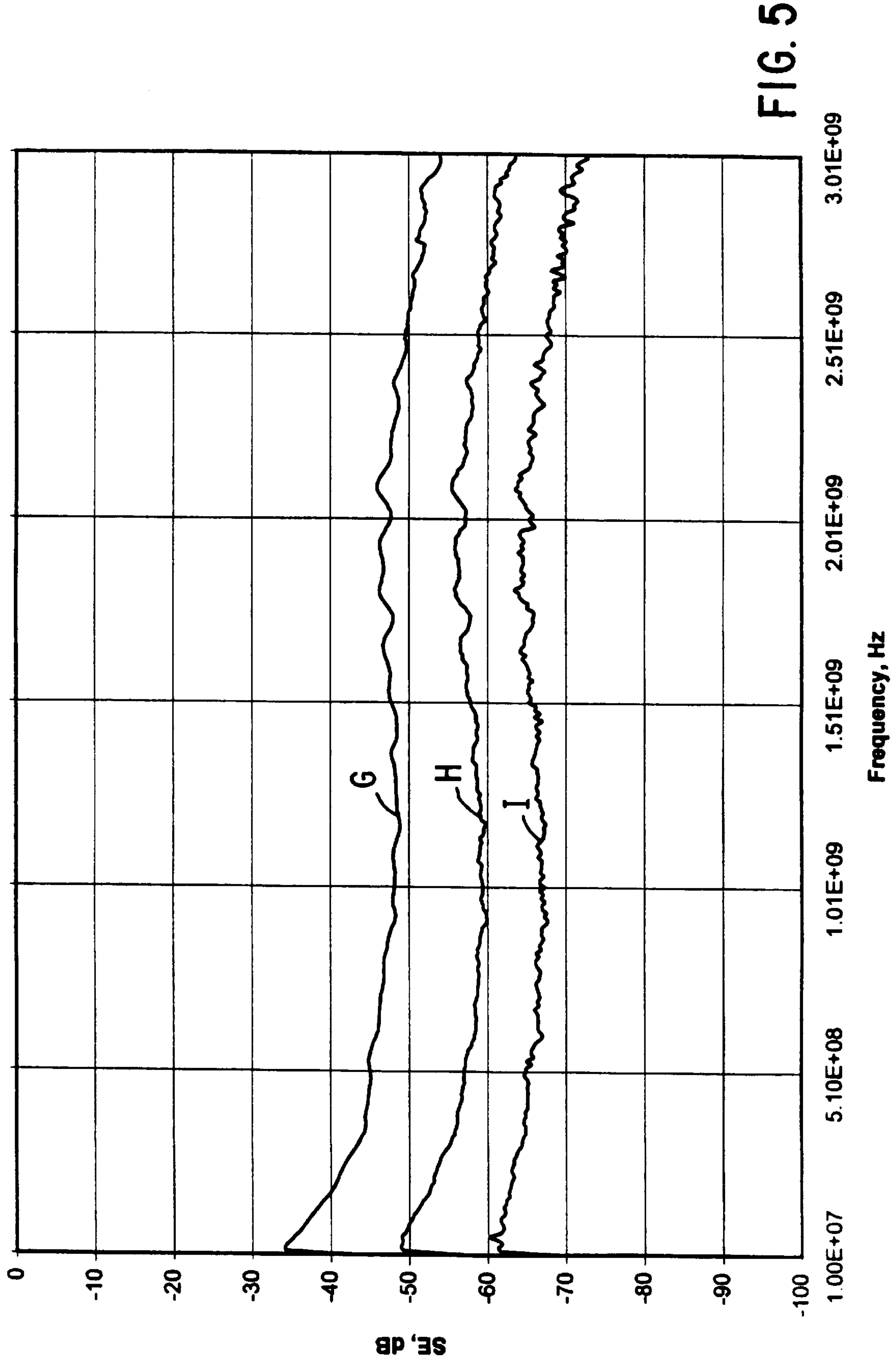
FIG. 5 is a graph of shielding effectiveness (dB) versus frequency (Hz) for a comparative example of an electrically conductive composite article, wherein the electrically conductive particles are carbon.

FIG. 5 represents the shielding effectiveness versus the frequency, from a range of $1\times10^7$ to $3\times10^9$ Hz. The S.E. was calculated for three different pressures. Line G represents the S.E. at 1 psi. Line H represent the S.E. at 50 psi. Line I represents the S.E. at 250 psi. A summation of the results follows:

At 1 psi, the S.E., which can be seen in FIG. 5 and is represented by line G, maintained on average a level of about −45 dB., throughout the tested frequency spectrum.

At 50 psi, the S.E., represented by line H, maintained, on average, a level of about −55 dB.

At 250 psi the S.E., represented by line I, maintained, on average, a level of about −65 dB.

Although a few exemplary embodiments of the present invention have been described in detail above, those skilled in the art readily appreciate that many modifications are possible without materially departing from the novel teachings and advantages which are described herein. Accordingly, all such modifications are intended to be included within the scope of the present invention, as defined by the following claims.

Having described the invention, what is claimed is:

1. An continuously electrically conductive composite article consisting essentially of:

a shaped main body formed from a polytetrafluoroethylene material and a plurality of electrically conductive particles; and an elastomer material disposed within said main body, wherein said electrically conductive composite article has a shield effectiveness of at least 70 dB in a frequency range from 0.1 GHz to 18 GHz.

2. The invention of claim 1, wherein the electrically conductive particles are selected from a group consisting of: metal powder, metal bead, metal fiber, metal flake, metal coated fiber, metal coated metals, metal coated ceramics, metal coated glass bubbles, metal coated glass beads, and metal coated mica flakes.

3. The invention of claim 2, wherein the electrically conductive particles define a mixture of at least two of said selected electrically conductive particles.

4. The invention of claim 2, wherein an average size of the electrically conductive metal flakes is in a range from about 1 to about 200 microns.

5. The invention of claim 2, wherein an average size of the electrically conductive metal powders is in a range from about 0.5 to about 200 microns.

6. The invention of claim 1, wherein the electrically conductive particles are selected from a group consisting of: silver, nickel, aluminum, copper, stainless steel, graphite, carbon, gold, and platinum particles.

7. The invention of claim 1, wherein the elastomer material is selected from a group consisting of: silicone elastomers, silicone rubbers, fluorosilicone elastomers, fluorocarbon elastomers, perfluoro elastomers, fluoroelastomers, polyurethane, and ethylene/propylene (EPDM).

8. The invention of claim 1, wherein the elastomer material is dimethyl siloxane.

9. The invention of claim 1, wherein the elastomer material is reinforced with silicon dioxide.

* * * * *